United States Patent

[11] 3,622,644

| [72] | Inventors | Donald H. Kubicek;<br>Edmund T. Kittleman, both of Bartlesville, Okla. |
|---|---|---|
| [21] | Appl. No. | 778,795 |
| [22] | Filed | Nov. 25, 1968 |
| [45] | Patented | Nov. 23, 1971 |
| [73] | Assignee | Phillips Petroleum |

[54] OLIGOMERIZATION OF OLEFINS USING A RHENIUM COMPLEX CATALYST SYSTEM
10 Claims, No Drawings

| [52] | U.S. Cl. | 260/666 A, 260/683 |
|---|---|---|
| [51] | Int. Cl. | C07c 3/10 |
| [50] | Field of Search | 260/666 A, 666 B, 683 D |

[56] References Cited
UNITED STATES PATENTS

| 3,424,811 | 1/1969 | Mango | 260/680 |
|---|---|---|---|
| 3,424,812 | 1/1969 | Howman | 260/666 A |
| 3,448,163 | 6/1969 | Howman | 260/666 A |
| 3,485,889 | 12/1969 | Williams | 260/683 D |
| 3,450,732 | 6/1969 | Wilke et al. | 260/666 B |

OTHER REFERENCES

William H. Davenport et al., Ind. Eng. Chem., Vol. 60, pp. 10–19, Nov. 1968, pp. 17–18 relied on and attached.

*Primary Examiner*—Delbert E. Gantz
*Assistant Examiner*—Veronica O'Keefe
*Attorney*—Young and Quigg

ABSTRACT: Olefins are oligomerized by contacting the olefin with a homogeneous rhenium complex catalyst in combination with an organoaluminum adjuvant. Additionally, olefins are oligomerized by contact with a heterogeneous catalyst prepared by depositing upon a suitable solid support the homogeneous combination mentioned above.

OLIGOMERIZATION OF OLEFINS USING A RHENIUM COMPLEX CATALYST SYSTEM

FIELD OF THE INVENTION

This invention relates to the conversion of olefin hydrocarbons. In a further object aspect, this invention relates to the conversion of olefin hydrocarbons by contacting the olefin with a catalyst which has been deposited upon a suitable support. In a further aspect, the invention relates to the conversion of olefins to dimers and/or other oligomers.

DESCRIPTION OF THE PRIOR ART

A number of systems have been recorded in the prior art in which certain transition metal salts or complexes have been found to be active catalysts for the dimerization and oligomerization of olefins. In particular, a great number of nickel complexes have been found useful for this purpose particularly when used with an organoaluminum adjuvant. It has now been found, however, that active catalyst systems for the oligomerization of ethylene or the cooligomerization of ethylene with a higher molecular weight acyclic or cyclic monoolefin can be prepared from certain rhenium containing complexes.

OBJECTS OF THE INVENTION

It is an object of this invention to provide a method for the conversion of olefin hydrocarbons to dimers and/or oligomers.

Other aspects, objects, and the several advantages of the invention will be apparent to one skilled in the art from a study of the summary of the invention, the description of the preferred embodiments, end the claims.

SUMMARY OF THE INVENTION

The method of the invention comprises contacting ethylene or mixtures of ethylene and acyclic and/or cyclic monoolefins with a catalyst system which results from the admixture of (a) a rhenium complex having the general formula $(L)_2ReOX_3$ wherein X is chlorine, bromine, or iodine, and (L) is a ligand selected from organic phosphines, organic arsines, organic stibines, or tertiary amines, and (b) an organoaluminum compound thereby providing oligomers of ethylene or cooligomers of ethylene and acyclic and/or cyclic monoolefins. The invention also includes the preparation of olefinic oligomers utilizing a heterogeneous catalyst system which comprises the rhenium complex-organoaluminum adjuvant deposited upon a suitable support.

Each (L) component of the catalyst system is represented by $R_3Q$, $R_3N$, and

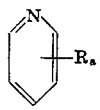

wherein Q is phosphorous, arsenic, or antimony; R is a saturated aliphatic or aromatic organic radical including alkoxy and halo-substituted radicals wherein the total number of carbon atoms of the R radical is up to about 20; and a is 0–5.

The organoaluminum component of the catalyst system is represented by the formula $AlR_bX_c$ wherein R is as defined above, b is 1–3, x is chlorine, bromine, or iodine, c is 0–2, and the sum of b and c is equal to 3. Mixtures of the organoaluminum compounds can be employed.

DESCRIPTION OF PREFERRED EMBODIMENTS

The olefins which are oligomerized according to the present process include ethylene and mixtures of ethylene with acyclic and/or cyclic monoolefins having up to about 12 carbon atoms per molecule. The acyclic monoolefins can contain terminal or internal unsaturation, branched or unbranched. However, it is advantageous that there is no branching nearer the double bond than the 3–position when branched acyclic or cyclic olefins are employed in admixture with ethylene. Frequently, the lower acyclic terminal olefins are preferred for coreaction with ethylene. The products obtained from the process of the present invention are olefinic oligomers which comprise dimers, codimers, or other lower polymerization products such as trimers, tetramers, and the like, and mixtures thereof.

Some examples of suitable acyclic olefins which can be employed in the reaction with ethylene in accordance with he invention include propylene, 1-butene, 1-pentene, 2-pentene, 1-hexene, 2-heptene, 1-octene, 2-nonene, 1-dodecene, 2-tetradecene, 1-hexadecene, 3-methyl-1-butene, 3-hexene, 4-methyl-4-octene, and the like, and mixtures thereof. The conversion of ethylene to dimers and other oligomers is a valuable feature of the invention.

Some examples of cyclic olefins suitable for the reaction with ethylene in accordance with the invention include cyclobutene, cyclopentene, cycloheptene, cyclooctene, 5-n-propylcyclooctene, cyclodecene, cyclododecene, and the like, and mixtures thereof.

Exemplary rhenium complexes which correspond to the formula $(L)_2ReOX_3$ and which are employed for the (a) component of the catalyst system are bis(triphenylphosphine)oxotribromorhenium
bis(triphenylarsine)oxotribromorhenium
bis(triphenylphosphine)oxotrichlororhenium
bis(diethylphenylphosphine)oxotribromorhenium
bis(triphenylstibine)oxotribromorhenium
bis(diethylphenylphosphine)oxotrichlororhenium
bis(dimethylphenylarsine)oxotrichlororhenium
bis(triethylphosphine)oxotrichlororhenium
bis(triphenylstibine)oxotrichlororhenium
bis(tripropylphosphine)oxotrichlororhenium
bis(triphenylphosphine)oxotriiodorhenium
bis(pyridine)oxotrichlororhenium
bis(diethylphenylphosphine)oxotriiodorhenium
bis(trichloromethylphosphine)oxotrichlororhenium
bis(triethylamine)oxotribromorhenium
bis(methyldibenzylamine)oxotriiodorhenium
bis(tricyclohexylphosphine)oxotribromorhenium
bis(trieicosylarsine)oxotribromorhenium
bis(4-isobutylpyridine)oxotribromorhenium
bis(3-butoxypyridine)oxotribromorhenium Exemplary organoaluminum (b) components of the catalyst system include methylaluminum dichloride, dimethylaluminum bromide, ethylaluminum dichloride, tributylaluminum, di-2-(ethylhexyl)aluminum bromide, phenylaluminum dichloride, di(3-bromopropyl)aluminum bromide, benzyl aluminum diiodide, dieicosylaluminum bromide, triethylaluminum, and the like and mixtures thereof such as methylaluminum sesquichloride and ethylaluminum sesquichloride. Preferred organoaluminum compounds are organoaluminum halides with ethylaluminum dihalides being particularly effective and convenient.

The rhenium complex components can be prepared by any suitable procedure, for example, by the reaction of a rhenium oxyhalide with a suitable ligand-forming material. Bromine-containing complexes are presently preferred. The organoaluminum compounds which are applicable for use in the catalyst system are also either commercially available or can be prepared by methods which are conventional in the art.

The catalyst of the present invention is prepared by combining the rhenium complex and the organoaluminum compound under conditions of time and temperature which permit the active catalyst to form. These two components can be mixed at temperatures in the range of from about −60° to about 0° C. for a period of time ranging from a few seconds up to several hours in the presence of a diluent in which both of the components are at least partially soluble. Preferably, the catalyst is prepared by admixing the two components at a temperature in the range of −20° to about 0 C. examples of suitable solvents or diluents are chlorobenzene, methylene chloride, ethylene chloride, benzene, and the like. Halogenated diluents are preferred. In the formation of the catalyst system, the mixing of the two components is generally carried out in an inert atmosphere and in the substantial absence of air or moisture. After the catalyst is formed, it need not be isolated but can be added directly to the reaction zone as a solution or suspension in its preparation medium. If desired, the first and second components used to form the catalyst can be separately added, in any order, to the reaction zone either in the presence or absence of the feed olefin.

For use as a catalyst system in the process of the present invention, the above-described rhenium complexes and organoaluminum compounds are generally combined in proportions in the range of from about 0.5 to about 20 mols of the aluminum component per mol of the rhenium component. Occasionally, it is desirable to add still larger proportions of the aluminum component as a scavenger to remove any catalyst poisons from the system.

The oligomerization of ethylene or mixture of ethylene and one or more olefins can take place at temperatures which are suitable to obtain the desired reaction. Good results are obtained within the range of $-50°$ to about $75°$ C. Preferably, the reaction is carried out at $-20°$ to about $25°$ C. The reaction can take place within a wide range of pressure. Normally, it is desirable to carry out the oligomerization reaction under pressures ranging up to about 2,000 p.s.i.g. and preferably 20–500 p.s.i.g. If desired, the oligomerization can be carried out in the presence of a diluent, for example, the diluent used for the catalyst preparation. The time of contact of the olefin with the catalyst for the oligomerization of the olefin will vary depending upon the desired degree of conversion but, generally, will be within the range of from 0.1 minute to about 20 hours, preferably 5–120 minutes. The proportion of catalyst composition to the olefin feed in the reaction zone will generally be such that the rhenium complex is within the range of from about 0.001 to about 0.1 mols per mol of olefin feed.

Any suitable contacting technique can be utilized for the olefin oligomerization and batchwise or continuous operation can be utilized. After the desired degree of conversion of the olefin to the oligomer or cooligomer, if it is desirable, the products so formed can be separated and isolated, for example, by conventional means such as by fractionation, crystallization, adsorption, and the like. The unconverted feed material can be recycled to the reaction zone. If desired, the catalyst can be destroyed by treatment with suitable deactivating agents such as water or alcohol prior to the separation of the products.

The homogeneous catalysts of this invention can be deposited upon a suitable support or carrier and used in the oligomerization reaction, preferably where the olefin feed is in the vapor phase. Catalyst supports include solid, inorganic or organic materials conventionally used as catalyst supports or carriers such as silica, alumina, silica-alumina, titania, boria, zeolites, ion exchange resins, solid polymers containing functional groups such as those prepared by the polymerization of 4-vinylpyridine, vinyl dimethylphosphine, or other suitable solid supports.

The support can be impregnated with the homogeneous catalyst by wetting the support with a solution of the catalyst in a solvent which is then evaporated. The support can also be impregnated with either the (a) or (b) component and the remaining component can be added later. For example, the solid support material can be impregnated with the (a) component and the resulting composite conveniently stored until required. Just prior to use, the composite can be treated with the (b) component, or, if the reaction is in the liquid phase, the (b) component cant simply be added to the reaction zone. Among solvents suitable, relatively low-boiling organic solvents such as pentane, methylene chloride, cyclohexane, and the like have desirable characteristics. The amount of homogeneous catalyst added to the support can advantageously be from 0.1 to about 30 weight percent of the total weight of the catalyst and support. If the support is to be activated by calcination, it is advantageously activated prior to the impregnation step.

Conventional impregnation and evaporation conditions in preparing the catalyst can be used. For example, temperatures up to about $150°$ C. are advantageously employed. Operating conditions in carrying out the oligomerization are the same for the supported and the nonsupported homogeneous catalyst systems.

EXAMPLE I

Into a dry 7-ounce beverage bottle were added 0.4 g. of bis(triphenylphosphine) oxotribromorhenium and 49 ml. of dry chlorobenzene. The system was flushed with dry nitrogen, cooled to $0°$ C., and 1 ml. of a one molar solution of ethylaluminum dichloride in chlorobenzene was added at $0°$ C. This mixture was stirred for 2 hours at $0°$ C. and then allowed to warm to a room temperature for 1 hours.

A 300 cc. autoclave was flushed with 50 cc. of chlorobenzene containing 3 ml. of a 1 molar solution of ethylaluminum dichloride in chlorobenzene. The autoclave was drained, and the catalyst solution prepared above was cooled to $-20°$ C. and added together with 10 ml. of cyclopentene, also at $-20°$ C. Ethylene was then admitted at 300 p.s.i.g. The mixture was stirred for 2 hours and allowed to warm to room temperature while stirring for one hour more. The reaction was then terminated by hydrolyzing the reaction mixture with water. The organic phase was then sampled and analyzed by GLC.

The analysis showed the presence of about 4 g. of ethylcyclopentene, 10 g. of butenes, and 2 g. of hexenes. These results illustrate that the catalyst of the invention is active not only for converting ethylene to oligomers but is also active for codimerization of olefinic mixtures such as ethylene and cyclopentene.

Reasonable variations and modifications are possible without departing from the spirit and scope of the invention.

We claim:

1. A method of preparing cooligamers of ethylene and monocyclic monoolefins having up to 12 carbon atoms per molecule which comprises contacting ethylene and said monocyclic monoolefin with a catalyst which forms on admixture of a rhenium complex having the formula $(L)_2ReOX_3$ wherein each X is chlorine bromine, or iodine, each L is a ligand represented by the formula $R_3Q$, wherein Q is phosphorous, arsenic, or antimony; R is a saturated aliphatic or aromatic radical having from one to 20 carbon atoms per molecule including alkoxy and halo-substituted derivatives thereof; and (b) an organoaluminum compound represented by the formula $AlR_bX_c$ wherein R is as defined above, X is as defined above, b is 1–3, c is 0–2, and the sum of b and c is equal to 3.

2. A method according to claim 1 wherein the oligomers comprise dimers, codimers, or other lower polymerization products, and mixtures thereof.

3. A method of preparing a mixture of olefinic oligomers consisting essentially of butenes, hexenes, and ethylcyclopentene which comprises contacting ethylene and cyclopentene with a catalyst comprising bis(triphenylphosphine) oxotribromorhenium in admixture with ethylaluminum dichloride.

4. A method according to claim 1 wherein the ethylene and cyclic monoolefin are contacted with the catalyst at a temperature in the approximate range of $-50°$ to $75°$ C.

5. A method according to claim 1 wherein the catalyst is deposited upon a solid support prior to contact with the olefin.

6. A method according to claim 5 wherein the solid support is silica, alumina, silica-alumina, titania, boria, zeolites, ion exchange resins, or solid polymers of 4-vinylpyridine or vinyl dimethylphosphine.

7. A method according to claim 1 wherein the (a) components of the catalyst are combined with the (b) components of the catalyst in the approximate range of 0.5 to 20 mols of the (b) component per mol of rhenium.

8. A method according to claim 1 wherein the catalyst is bis(triphenylphosphine)oxotribromorhenium, in admixture with ethylaluminum dichloride.

9. A method according to claim 1 wherein the olefins are ethylene and cyclopentene.

10. A method according to claim 1 wherein X in the metal complex is bromine, and c is 2.

* * * * *